3,786,151
METHODS OF COMBATTING BACTERIA OR FUNGI USING 3-METHYL-4,4-DICHLORO-5-PYRAZOLONE

Pierre Girault, Paris, and Guy Hagemann, Nogent-sur-Marne, France, assignors to Roussel-UCLAF, Paris, France
No Drawing. Filed Aug. 16, 1971, Ser. No. 172,272
Claims priority, application France, Aug. 17, 1970, 30,177
Int. Cl. A01n 9/22
U.S. Cl. 424—273         2 Claims

ABSTRACT OF THE DISCLOSURE

Biocidal 3-methyl 4,4-dichloro 5-pyrazolone, biocidal mineral or organic salts thereof, biocidal compositions containing 3-methyl 4,4-dichloro 5-pyrazolone or its mineral or organic salts, a method for controlling bacteria and a method for controlling bacteria and fungi.

PRIOR ART 3-methyl 4,4-dichloro 5-pyrazolone has been described by L. A. Carpino (J. Am. Chem. Soc. 80, 1958, p. 599) but its biocidal properties were not known.

OBJECTS OF THE INVENTION

It is an object of the invention to provide biocidal 3-methyl 4,4-dichloro 5-pyrazolone and biocidal mineral or organic salts thereof.

It is another object of the invention to provide biocidal compositions containing 3-methyl 4,4-dichloro 5-pyrazolone or its mineral or organic salts.

It is a further object of the invention to provide a method for controlling bacteria.

It is yet a further object of the invention to provide a method for controlling bacteria and fungi.

These and other objects and advantages of the invention will become obvious from the following detailed description.

THE INVENTION

The invention has as object the biocidal 3-methyl 4,4-dichloro 5-pyrazolone of the Formula I:

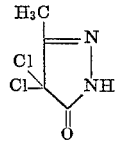

(I)

and its biocidal mineral or organic acid salts.

An example of the preparation of 3-methyl 4,4-dichloro 5-pyrazolone is given below, the salts of this compound being obtained by well-known processes.

The bactericidal and biocidal properties of the Compound I are made evident by tests on *Aerobacter aerogenes*. Details of these tests are given below. The properties of the Compound I and of its salts make them suitable for use more particularly in controlling bacteria polluting industrial waters.

The invention also concerns pesticidal, and especially bactericidal and biocidal compositions containing, as active material, at least one compound of Formula I and/or one of its salts. These compositions can be in the form of powders, granules, suspensions, emulsions or solutions, containing the active principle, for example in a mixture with a vehicle and/or an anionic, cationic or non ionic surface-active agent assuring inter alia a uniform dispersion of the substances of the composition. The vehicle used can be a liquid such as water, alcohol, hydrocarbons or other organic solvents, a mineral, animal or vegetable oil, or a powder such as talc, clays, silicates or kieselguhr.

The solid compositions, in the form of dusting powder, wettable powders or granules, can be prepared by grinding the active compound in with an inert solid or by impregnating the solid support with a solution of the active principle in a solvent which one then evaporates.

As a biocidal composition one can use, for example, a wettable powder containing, by weight, 25% of Compound I, 15% of Ekapersol "S" (product of condensation of sodium naphthalene sulphonate), 0.5% of Brecolane N.V.A. (sodium alkylnaphthalene sulphonate), 34.5% of Zeosil 39 (Synthetic hydrated silica obtained by precipitation) and 25% of Vercoryl "S" (colloidal kaolin).

The invention also concerns a method for bactericidal control, which comprises using, for controlling bacteria and especially bacteria polluting industrial waters, at least one of the compounds, possibly admixed with one or more other pesticidal agents.

The invention has likewise as object pharmaceutical compositions containing as active matter the Compound I and/or at least one of its salts with a therapeutically compatible acid. The antifungic properties of these compounds make them suitable for use more particularly in cases of cutaneous and fungic dermatosis, mycosis of the foot, mycotic intertrigo, mycotic eczema, mycotic vaginitis, impetigo, pyodermatitis, eczematiform dermatitis, epidermomycosis, dysidrosis and onychomycosis.

These compounds are used by local route in topical application on the skin and the mucous membranes. They can be in the form of lotions, solutions or suspensions, creams, ointments or preparations for cosmetic use, especially creams and hygiene products.

These forms of use are prepared according to the standard processes.

The useful dosage of these compounds depends on the method of application, the active matter concentration of the pharmaceutical forms can vary from 0.1 to 5% for application one to three times per day.

EXAMPLE

Preparation of 3-methyl 4,4-dichloro 5-pyrazolone

One introduces 40 g. of 3-methyl 5-pyrazolone into 400 cc. of acetic acid. One agitates then one bubbles a stream of chlorine (59 g.) into the reaction mixture at $+15°$ C. in thirty minutes. One agitates for two hours at ambient temperature then distills the acetic acid under reduced pressure. One triturates the residue with water, ice-cools for one hour, and suction-filters. One washes by pasting with ice water and dries in vacuo. One thus obtains 62 g. of 3-methyl 4,4-dichloro 5-pyrazolone in the form of a pale yellow solid, soluble in methanol, ethanol, acetone and ether, slightly soluble in chloroform and benzene, insoluble in water. M.P.=115 to 116° C.

This compound is identical to that described by Louis A. Carpino J. (1.c.).

Study of the biocidal activity of 3-methyl 4,4-dichloro 5-pyrazolone (a) Bacteriostatic activity on *Pseudomonas aeruginosa:* Inhibition of the development of the bacterium used on a nutritive liquid medium, enriched with toxic substance, enables the bacteriostatic efficacy to be measured.

One uses as a nutritive medium a liquid meat broth which is treated with an aqueous solution of the product under study. Contamination is effected at the rate of 1 cc. of bacterial strain in 100 cc. of broth. There are two repetitions per concentration. Checking is carried out after keeping in stock in an oven at 37° C. for forty-eight hours. It consists in evaluating the percentage of diminution of the bacterial disorder in compraison with an untreated, contaminated control.

A parallel test is carried out by treating with a mixture of dithiocarbamates mainly containing sodium dimethyldithiocarbamate (Prosan S10).

The results obtained are summarized in the following table:

| Doses, p.p.m. M.A. | Percentage of inhibition | |
| --- | --- | --- |
| | 3-methyl 4,4-dichloro 5-pyrazolone | Prosan S10 |
| 200 | | 100 |
| 100 | | 0 |
| 80 | 100 | |

(b) Bactericidal activity on *Pseudomonas aeruginosa:* Starting from the broths of tests (a), having been used for the bactreiostatic tests, one inoculates, in lines, a gelled nutritive broth, after dipping the inoculating needle in each of the dilutions made. After keeping in stock for forty-eight hours at 37° C., one evaluates the percentage of diminution of the bacterial development as against an untreated control. A parallel test is carried out by treating with a mixture of dithiocarbamates mainly containing sodium dimethyldithiocarbamate (Prosan S10).

The results obtained are summarized in the following table:

| Doses, p.p.m. M.A. | Percentage of inhibition | |
| --- | --- | --- |
| | 3-methyl 4,4-dichloro 5-pyrazolone | Prosan S10 |
| 200 | | 100 |
| 100 | 100 | 0 |
| 80 | 80 | |

The bacteriostatic and bactericidal activity of 3-methyl 4,4-dichloro 5-pyrazolone is thus, under the conditions of the experimentnt, much superior to that of Prosan S10.

(c) Test on materials (*Aerobacter aerogenes*): The inhibition of the test bacterium, cultivated on a medium of paper pulp enriched with toxic substance, conveys the biocidal efficacy of the compound.

One uses paper pulp (mechanical pulp) in a 12.5 g./l. aqueous suspension with resin glue, one effects contamination with an "*Aerobacter aerogenes*" suspension, and one treats with the product under study at concentrations of 400, 200, 100 and 50 p.p.m. Each concentration is repeated twice. One leaves to incubate for twenty hours at 37° C., then one removes a sample to count the number of spores per cc. Next, one introduces the active product. The sample is again placed in an oven at 37° C. Counts are then made after one hour, four hours and seven hours starting from the time of treating. The results are expressed as a percentage of diminution of the number of spores taking into account an untreated control.

The results obtained are summarized in the following table:

Concentration
in p.p.m.:                    Percentage of inhibition
400:
    After 1 hr. _____ 100
    After 4 hrs. _____ 100
    After 7 hrs. _____ 100
200:
    After 1 hr. _____ 98.7
    After 4 hrs. _____ 100
    After 7 hrs. _____ 100
100:
    After 1 hr. _____ 96.2
    After 4 hrs. _____ 100
    After 7 hrs. _____ 100
50:
    After 1 hr. _____ 60.3
    After 4 hrs. _____ 99.0
    After 7 hrs. _____ 100

Conclusion

The compound under study is endowed with bacteriostatic and bactericidal properties with respect to *Pseudomonas aeruginosa* and *Aerobacter aerogenes*. Its activity on paper pulp is particularly remarkable, and makes it particularly interesting, especially for protecting paper mill circuits.

Pharmacological study of 3-methyl 4,4-dichloro 5-pyrazolone

Antifungic activity in vitro in a liquid medium: One determnies the minimum inhibitory concentration in a liquid medium (Oxoid-containing liquid Sabouraud medium) after twenty-four hours' incubation.

The minimm inhibitory concentration with respect to *Canadida albicans* is 1 µg./ml.

The product under study thus has an interesting antifungic activity.

Various modifications of the compositions and methods of the invention may be made without departing from the spirit or scope of the invention.

We claim:

1. A method of combatting bacteria or fungi comprising contacting bacteria or fungi with an antibacterial or antifungal amount of 3-methyl-4,4-dichloro-5-pyrazolone.

2. The method of claim 1 wherein the said pyrazolone is applied to bacteria or fungi in industrial water.

References Cited

Carpino et al.: J. Am. Chem. Soc. 80 (1958) pp. 599–601.

ALBERT T. MEYERS, Primary Examiner

A. J. ROBINSON, Assistant Examiner